US008596689B2

(12) United States Patent
Simon et al.

(10) Patent No.: US 8,596,689 B2
(45) Date of Patent: Dec. 3, 2013

(54) SHORT-BODY PLUG FOR FLUID COUPLINGS

(75) Inventors: Horst Simon, Gummersbach (DE); Stefan Witt, Eberdingen (DE)

(73) Assignee: Parker Hannifin Mfg. Germany GmbH, Eberdingen-Nussdorf (DE)

( * ) Notice: Subject to any disclaimer, the term of this patent is extended or adjusted under 35 U.S.C. 154(b) by 314 days.

(21) Appl. No.: 12/574,148

(22) Filed: Oct. 6, 2009

(65) Prior Publication Data
US 2010/0066078 A1 Mar. 18, 2010

Related U.S. Application Data

(63) Continuation of application No. PCT/EP2008/002396, filed on Mar. 27, 2008.

(30) Foreign Application Priority Data

Apr. 13, 2007 (DE) .......................... 10 2007 179 105
Mar. 27, 2008 (WO) ................. PCT/EP2008/002396

(51) Int. Cl.
*F16L 37/23* (2006.01)
(52) U.S. Cl.
USPC .......................................... 285/316; 285/276
(58) Field of Classification Search
USPC ................... 285/316, 317, 276, 277
See application file for complete search history.

(56) References Cited

U.S. PATENT DOCUMENTS

| 2,425,500 | A | * | 8/1947 | Wiggins | 137/614.04 |
| 2,646,994 | A | * | 7/1953 | Scheiwer | 137/614.04 |
| 2,689,138 | A | * | 9/1954 | Scheiwer | 137/614.03 |
| 2,727,759 | A | * | 12/1955 | Elliott | 251/149.6 |
| 2,839,314 | A | * | 6/1958 | Clark | 137/614.04 |
| 2,654,259 | A | | 9/1958 | Clark | |
| 3,028,179 | A | * | 4/1962 | Abramoska | 285/317 |
| 3,279,497 | A | * | 10/1966 | Supinger et al. | 137/614.03 |
| 3,334,860 | A | | 8/1967 | Bolton, Jr. | |
| 3,407,847 | A | * | 10/1968 | Snyder | 137/614.06 |
| 3,704,002 | A | | 11/1972 | Skarzynski | |
| 4,086,939 | A | * | 5/1978 | Wilcox et al. | 137/614.03 |
| 4,182,370 | A | * | 1/1980 | Karcher | 137/614.04 |
| 4,429,713 | A | * | 2/1984 | Walter | 137/614.03 |
| 4,877,219 | A | * | 10/1989 | Yano | 251/149.2 |
| 5,123,448 | A | * | 6/1992 | Kjellberg et al. | 137/614.03 |
| 7,131,458 | B2 | * | 11/2006 | Kohda | 137/614.03 |

(Continued)

FOREIGN PATENT DOCUMENTS

EP 1 729 051 A1 12/2006
GB 813 194 5/1959

OTHER PUBLICATIONS

International Search Report dated Aug. 11, 2008 in corresponding International Application No. PCT/EP2008/002396.

*Primary Examiner* — James Hewitt
(74) *Attorney, Agent, or Firm* — John A. Molnar, Jr.

(57) ABSTRACT

A short-body connector for fluid couplings made of a sleeve-shaped body. In the sleeve-shaped body an internal thread is provided, by which the connector can be screwed onto a threaded connection. Relative to axial extension, the locking groove and locking rib serving to hold the connector in the coupler are located at the height of the thread. That is, the locking rib and locking groove located ahead of the thread in the state of the art have moved to the region of the thread in the arrangement according to the invention.

12 Claims, 1 Drawing Sheet

(56) References Cited

U.S. PATENT DOCUMENTS

2004/0211474 A1* 10/2004 Mikiya et al. ............ 137/614.04
2004/0238048 A1* 12/2004 Mikiya et al. ............ 137/614.04
2008/0035222 A1* 2/2008 Fraser ...................... 137/614.04

* cited by examiner

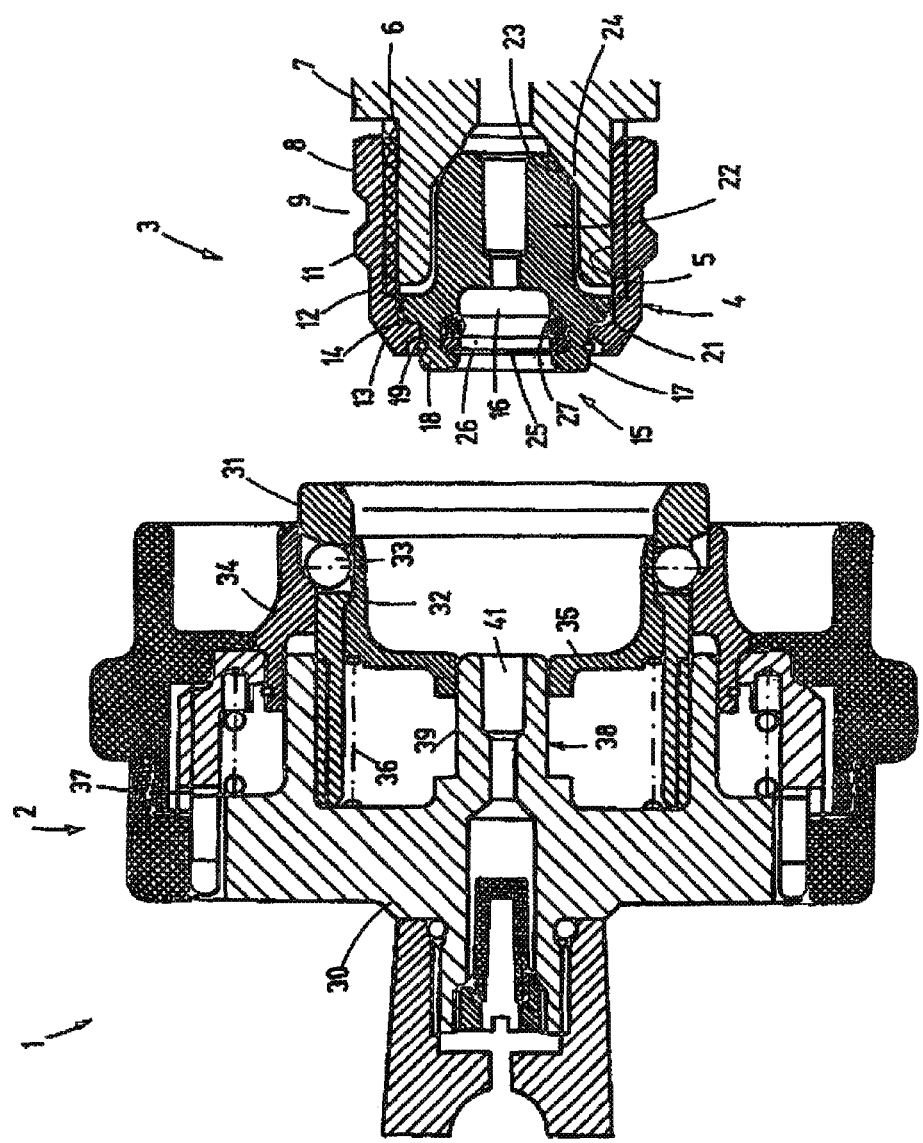

US 8,596,689 B2

SHORT-BODY PLUG FOR FLUID COUPLINGS

CROSS-REFERENCE TO RELATED CASES

This application is a continuation of copending International Application No. PCT/EP2008/002396, filed Mar. 27, 2008, which designated the United States, and which claims priority to German Patent Application No. 10 2007 0179105, filed Apr. 13, 2007, the disclosure of which is expressly incorporated herein by reference.

BACKGROUND OF THE INVENTION

The present invention relates broadly to fluid couplings having a female member or coupler and a male member or plug, and more particularly to a short-body plug for such couplings.

Detachable fluid couplings are used to connect fluid lines. The fluid coupling includes a coupler and a plug that can be plugged into the coupler. Within the coupler, there are locking elements that hold the plug in the coupler, so that it is not pushed out by the hydraulic force of the fluid. In addition, capturing means can also be contained in the coupler, that hold the plug in an intermediate position, so that fluid under pressure can escape into the atmosphere without a backward force appearing that would push the plug out.

The plug used for this consists of a tube-shaped male end and a threaded end. The male end is inserted in the socket, while the threaded end is provided to attach the plug to a hose or a tube line. The plug is made correspondingly long, which is especially problematic when the plug is attached to a stiff, immovable part, for example a cylinder valve.

It is believed that a short-body plug would be desirable.

BROAD STATEMENT OF THE INVENTION

The present invention is directed to a short-body plug for a fluid coupling.

The short-body plug has a sleeve or tube-shaped body, in which an inner thread is provided to connect the plug to a cylinder valve or a tube line. The outside of the tube-shaped or sleeve-shaped body carries the locking means, which works together with the locking means in the bushing body. The locking means are situated, with respect to the axial direction of the body, at the height of the thread. Thus in the solution according to the invention, the attachment means and the thread are no longer one after the other in the axial direction, but arranged next to each other in the radial direction. The required construction length of the plug is shortened.

Moreover, means of sealing are provided, in order to seal the plug against the bushing.

At least the body, preferably the entire plug can be made with rotation symmetry.

The locking means on the outside can be designed as circumferential ribs, and a circumferential groove, or as a combination of groove and ribs. Which variant is more favorable in each case depends on the other requirements and the dimensions.

For assembling the plug, it can have a tool-setting surface, for example a hexagon.

The sealing means that seal the plug with respect to the gushing can be formed from a cylinder surface, for example an outer cylinder surface, when the bushing has a corresponding O-ring seated on the inside, as is encountered very frequently.

Another possibility for the sealing surface consists of a cylindrical hole in the body. Depending on the design of the complementary bushing, it can be situated in the O-ring in an inner groove of the plug or it can be designed to be flush with the hole.

Favorable assembly relationships are achieved when the plug arrangement contains an insert piece with a sealing surface to seal a thread support, onto which the plug arrangement is screwed. It is thereby also possible to achieve a deep seated sealing surface of the thread support, as is sometimes encountered in valves of pressure-gas containers.

The sealing surface can by designed in the shape of a segment of a sphere, which opens the possibility of a metallic seal.

For a simple connection of the insert piece to the body, the insert piece can carry a radially projecting flange or band that works together with a corresponding shoulder surface in the hole of the body.

When the plug arrangement is such that the O-ring sealing is formed in the insert piece, the connection between the insert piece and body does not have to be fluid-tight.

The assembly can be simplified when the insert piece is provided with a spring ring groove with the radial flange that secures the insert piece in the body in the axial direction. After being screwed to the thread support, the spring ring has no function.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and objects of the invention, reference should be had to the following detailed description taken in connection with the accompanying drawings wherein:

FIG. 1 cross-sectional view of a fluid coupling including a short-body plug in accordance with the present invention and an associated coupler.

The drawings will be described further in connection with the following Detailed Description of the Invention.

DETAILED DESCRIPTION OF THE INVENTION

FIG. 1 shows a fluid-coupling arrangement 1 in the uncoupled state. The coupling arrangement 1 includes a coupler 2 and a plug 3 according to the invention that can be plugged into the coupler 2.

The plug 3 has a sleeve-like body 4, which is provided with an inner thread 5. With the aid of the inner thread 5, the body 4 can be screwed onto an outer thread 6 of a cylinder valve, of which only the thread support 7 can be recognized. The outside of the body 4 has rotation symmetry and carries at its back end, i.e., at the end away from the coupler 2, a hexagon 8 as a tool-gripping surface. Directly adjacent to the hexagon 8, a circumferential groove 9 with a trapezoidal cross-section is present, which goes over to the insertion end of the plug 3 into a rib 11. When connected to the rib 11, the outer circumferential surface of the body 4 is at first a cylindrical surface 12 in design, which goes over into a beveled milled surface 13 at its free end.

At the height of the milled surface 13, a circumferential rib 14 projects into the interior of the sleeve-shape base body 4.

As can be recognized from the diagram, rib 11 and the groove 9 are situated at the height of the inner thread 5. In other words, the connecting means for the line to be connected are pushed into the mouthpiece of the plug 2 equally. A very short construction form arises thereby, compared to that of the state of the art, in which the mouthpiece and the thread are arranged one after the other.

In the interior of the body 4, an insert piece 15. The insert piece 15 is likewise tube-shaped, and it contains a stepped hole 16.

Starting from the end of the plug, the insert piece 15 forms a cylindrical section 17 with a channel 18 for an outer spring ring 19. When connected to the cylindrical section 17, the insert piece forms 1 band or flange 21 that projects radially outward.

The band or flange 21 works together, as shown, with rib 14, which projects inward.

Next, on the flange or band 21, the insert piece 15 goes over into a cylindrical part 22, which is closed by an end in the shape of spherical segment 23.

As shown, the cylindrical part 22 projects into the cylindrical hole in the screw connection 7, and the assembled state, it strikes a conical surface 24. There, the insert piece forms a metal seal with the metallic screw connection 7.

In the stepped hole, a ring groove 25 is pushed into the opening region, in which an equalizing ring 26 and an O-ring seal 27 are placed.

Since the busing part 2 is not the object of the invention, it is sufficient to explain only the parts of it that are important for understanding the way in which the plug 3 works.

The coupler 2 has a body 30, into which a base-body sleeve 31 is screwed. The body sleeve 31 contains radial holes 32 for a wreath of locking balls 33. The position of the locking balls 33 will be controlled on the one hand by an outer control sleeve 34, which is designed to slide axially on the outside of the base-body sleeve 31, and on the other hand by an inner control sleeve 35, which is likewise designed to slide axially in the interior of the base-body sleeve 31. By means of prestressed springs 36 and 37, the two control sleeves 34 and 35 are prestressed in the position shown in FIG. 1.

From the body 30, a mouthpiece 38 projects in the axial direction, which is arranged to be coaxial to the hole in the base-body sleeve 31. The mouthpiece forms a cylindrical outer circumferential surface 39, which it designed to work together with the O-ring 27 to form a seal. A fluid hole 41 runs through the mouthpiece 38.

The plug 3 is assembled by the insert piece 15 being first introduced in a pre-assembly step from the back side of the body 4, until the flange 21 reaches the inner rib 14. Then the spring ring 19 is placed in the spring-ring groove 18, whereby the insert piece 15 is secured in the body 4 in the axial direction. The body 4 and the insert piece 15 thereby form a component group consisting of two main components, which are attached immovably to each other with the aid of the spring ring 19 of the flange 21 and the inner rib 14.

Then, the O-ring 27 is placed in groove 25 and then the equalizing ring 26. Its task consists of reducing the effective slit that the O-ring 27 sees on the mouthpiece 38. Ring 26 floats in groove 25.

The unit obtained in this way is now screwed on the thread support 7 and pulled tight. During the tightening, the surface of the spherical segment 23 lies on the conical surface 24 of the thread support 7 and forms a metallic seal that is fluid-tight even at high pressures.

With this, assembly of the plug is complete. As can be seen, the components that cause the locking of the plug 3 are situated at the height of the inner thread 5 with respect to the axial extent of the plug 3.

The unit obtained in this way can now be coupled with the coupler 3 in that the plug 3 is pushed with the cone surface 13 forward, into the inner space of the base-body sleeve 31. With this, through the pushing movement, the inner control sleeve 3 is pressed against the effect of the spring 36 and releases the mouthpiece 38. With further pushing movement, the O-ring 27 slides along the outer circumferential surface 39 of the mouthpiece 38. The pushing movement ends as soon as the rib 11 passes the locking balls 33, which are arranged in a wreath, and the locking groove 9 receives the wreath of locking balls 33. Now the other spring 37 pushes the other control sleeve 34 forward in the direction of the plug 3 and the wreath of locking balls 33 is held by corresponding control surfaces in the radially inward position, in which the balls 33 are meshed in the locking groove 9. The plug 3 is thus locked in the coupler 2 in the axial direction in a form-tight manner. At the same time, the coupled arrangement is fluid-tight, since the insert piece 15 is sealed with the aid of the O-ring 27 on the mouthpiece 38. A fluid-tight connection is thus created between the hole 41 of the mouthpiece 38 with the stepped hole 16 in the insert piece 15. The insert piece 15 is in turn sealed by the metal sealing on surfaces 23 and 24 and held in the thread support 7.

The plug 3 according to the invention is very short, since the locking means are situated at the height of the inner thread 15 in the design of the ribs 11 and the groove 11, and not, as in the state of the art, at a distance in the axial direction. The mouthpiece of the plug 3 contains the connecting thread.

The sealing between the coupler 2 and the plug 3 is locked in the insert piece 15 in the embodiment example shown. with this, the O-ring 27 is protected as well as possible against outside influences. But a possibility also exists of moving the O-ring 27 on the outer cylinder surface 12 and sealing it against a corresponding surface in the base-body sleeve 31. In such a case, the insert piece 15 can also be omitted, in that, for example, the inner rib 14 is designed in such a way that it can seal the front end of the thread support 7.

Another possibility consists of the front part of the insert piece 15, which contains groove 25, being made in one piece with the body 4 and using the shoulder surface, which is part of a single piece with the body 4, at the right end of the flange 21 as a sealing surface. The flange 21 would no longer be a separate component in the one-piece embodiment. Rather, the flange 21 is included in the body 4.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connection to a fluid component having a first fluid passageway therethrough and an externally-threaded male end, the coupling comprising:
    a coupler having a second fluid passageway therethrough, the coupler having a socket end with an opening and a generally annular locking member received coaxially in the socket end opening; and
    a generally tubular plug having a third fluid passageway therethrough and extending in an axial direction between a first end insertable coaxially in the socket end opening of the coupler and a second end configured to receive the male end of the fluid component, the plug having a radial inner surface including an internally-threaded portion threadably engageable with the externally-threaded male end of the fluid component when received in the second end of the plug, and a radial outer surface including a profiled portion disposed in a radial direction opposing the internally-threaded portion and in the axial direction disposed coextensive with the internally-threaded portion, the plug comprising a generally tubular body extending between a first end opening and a second end opening forming the second end of the plug, and a generally tubular insert having a channel therethrough forming the third fluid passageway, the insert extending between a forward end disposed coaxially with the first end opening of the body and a rearward end extending into the body, wherein with the male end of the fluid component being threaded into the second end of the plug such that the first fluid passageway of the fluid component is joined in fluid communication with the third fluid passageway of the plug, as the first end of the plug is inserted coaxially into the socket end opening of the coupler, the locking member is received coaxially thereover and into an interfering engagement fit with the profiled portion of the plug outer surface locking the plug into the coupler with the second fluid passageway of the coupler being joined in fluid communication with the third fluid passageway of the plug, and wherein when the coupling is connected to the fluid component the male end of the fluid component has a generally annular inner sealing surface surrounding the first fluid passageway, and the insert rearward end has a generally annular outer sealing surface abuttingly engageable against the inner sealing surface of the fluid component male end forming a fluid tight seal therebetween when the fluid component male end is threadably engaged with the plug.

2. The coupling of claim 1 wherein the profiled portion of the plug outer surface comprises a circumferential grove or rib.

3. The coupling of claim 1 wherein:
the second fluid passageway of the coupler opens into a mouth portion disposed coaxially with the socket end opening; and
the third fluid passageway of the plug opens into a bore formed into the plug first end, the bore being receivable coaxially over the mouth potion of the coupler to join the second fluid passageway of the coupler in fluid communication with the third fluid passageway of the plug as the first end of the plug is inserted coaxially into the socket end opening of the coupler.

4. The coupling of claim 3 wherein:
the coupler second fluid passageway mouth portion has an outer surface, and
the plug further comprises a generally annular seal member received coaxially in the third fluid passageway bore, the seal member being receivable in a fluid-tight sealing engagement over the mouth potion outer surface of the coupler.

5. The coupling of claim 1 wherein:
the body first end opening has a radial inwardly extending circumferential shoulder; and
the insert has a radial outwardly extending circumferential flange disposed intermediate the body shoulder and the insert rearward end, the insert flange and the body shoulder being engaged in an interference fit as the insert is urged towards the body first end.

6. The coupling of claim 5 wherein:
the insert has an outer circumferential groove formed intermediate the insert forward end and the flange; and
the coupler further comprises a spring ring received in the insert groove, the spring ring securing the insert in the body.

7. A coupling assembly comprising:
a fluid component having a first fluid passageway therethrough and an externally-threaded male end;
a coupler having a second fluid passageway therethrough, the coupler having a socket end with an opening and a generally annular locking member received coaxially in the socket end opening; and
a generally tubular plug having a third fluid passageway therethrough and extending in an axial direction between a first end insertable coaxially in the socket end opening of the coupler and a second end configured to receive the male end of the fluid component, the plug having a radial inner surface including an internally-threaded portion threadably engageable with the externally-threaded male end of the fluid component when received in the second end of the plug, and a radial outer surface including a profiled portion disposed in a radial direction opposing the internally-threaded portion and in the axial direction disposed coextensive with the internally-threaded portion, the plug comprising a generally tubular body extending between a first end opening and a second end opening forming the second end of the plug, and a generally tubular insert having a channel therethrough forming the third fluid passageway, the insert extending between a forward end disposed coaxially with the first end opening of the body and a rearward end extending into the body, wherein with the male end of the fluid component being threaded into the second end of the plug such that the first fluid passageway of the fluid component is joined in fluid communication with the third fluid passageway of the plug, as the first end of the plug is inserted coaxially into the socket end opening of the coupler, the locking member is received coaxially thereover and into interference fit with the profiled portion of the plug outer surface locking the plug into the coupler with the second fluid passageway of the coupler being joined in fluid communication with the third fluid passageway of the plug. and wherein when the coupling is connected to the fluid component the male end of the fluid component has a generally annular inner sealing surface surrounding the first fluid passageway, and the insert rearward end has a generally annular outer sealing surface abuttingly engageable against the inner sealing surface of the fluid component male end forming a fluid tight seal therebetween when the fluid component male end is threadably engaged with the plug.

8. The coupling assembly of claim 7 wherein the profiled portion of the plug outer surface comprises a circumferential grove or rib.

9. The coupling assembly of claim 7 wherein:
the second fluid passageway of the coupler opens into a mouth portion disposed coaxially with the socket end opening; and
the third fluid passageway of the plug opens into a bore formed into the plug first end, the bore being receivable coaxially over the mouth potion of the coupler to join the second fluid passageway of the coupler in fluid communication with the third fluid passageway of the plug as the first end of the plug is inserted coaxially into the socket end opening of the coupler.

10. The coupling assembly of claim 9 wherein:
the coupler second fluid passageway mouth portion has an outer surface, and
the plug further comprises a generally annular seal member received coaxially in the third fluid passageway bore, the seal member being receivable in a fluid-tight sealing engagement over the mouth potion outer surface of the coupler.

11. The coupling assembly of claim 7 wherein:

the body first end opening has a radial inwardly extending circumferential shoulder; and the insert has a radial outwardly extending circumferential flange disposed intermediate the body shoulder and the insert rearward end, the insert flange and the body shoulder being engaged in an interference fit as the insert is urged towards the body first end.

12. The coupling assembly of claim 11 wherein:

the insert has an outer circumferential groove formed intermediate the insert forward end and the flange; and the insert further comprises a spring ring received in the insert groove, the spring ring securing the insert in the body.

* * * * *